United States Patent
Rankin, Jr. et al.

(10) Patent No.: US 7,416,684 B2
(45) Date of Patent: Aug. 26, 2008

(54) METHOD OF VARYING WAVELENGTHS OF LIQUID CRYSTALS

(75) Inventors: Charles M. Rankin, Jr., Penfield, NY (US); Xiang-Dong Mi, Rochester, NY (US)

(73) Assignee: Industrial Technology Research Institute (TW)

( * ) Notice: Subject to any disclaimer, the term of this patent is extended or adjusted under 35 U.S.C. 154(b) by 498 days.

(21) Appl. No.: 10/977,838

(22) Filed: Oct. 29, 2004

(65) Prior Publication Data

US 2006/0093757 A1      May 4, 2006

(51) Int. Cl.
  *C09K 19/36*  (2006.01)
(52) U.S. Cl. .................................. 252/299.7
(58) Field of Classification Search .................. 428/1.1, 428/1.31; 252/299.01, 299.7
  See application file for complete search history.

(56) References Cited

U.S. PATENT DOCUMENTS 5,668,614 A      9/1997   Chien et al.
6,552,756 B1 *   4/2003   Kotani et al. ................... 349/20

\* cited by examiner

*Primary Examiner*—Shean C Wu
(74) *Attorney, Agent, or Firm*—Akin Gump Strauss Hauer & Feld LLP (57) ABSTRACT

The present invention relates to a method of generating a second peak wavelength of reflected light from a cholesteric liquid crystal having a first peak wavelength of reflected light comprising by exposing or conditioning the cholesteric liquid crystal to a high temperature or a high humidity. The invention also relates to an electrically modulated imaging layer and a display containing a liquid crystal material that has conditioned and unconditioned forms, wherein the unconditioned form of liquid crystal material reflects a first wavelength of light and wherein the conditioned form of liquid crystal material reflects a second wavelength of light.

20 Claims, 5 Drawing Sheets

METHOD OF VARYING WAVELENGTHS OF LIQUID CRYSTALS

FIELD OF THE INVENTION

The present invention relates to a method of varying wavelengths of cholesteric liquid crystals and devices incorporating the cholesteric liquid crystals of this method.

BACKGROUND OF THE INVENTION

Cholesteric liquid crystals have the property of maintaining several different optical states in the absence of an electrical field. Additionally, cholesteric liquid crystals can change optical states in response to applied electrical and/or thermal fields. Those properties make them useful in the development of field-stable, re-writable displays.

Cholesteric (chiral nematic) liquid crystals in a planar state are known to reflect circularly polarized light. The peak reflection wavelength is $\lambda = \bar{n} P_0$, and the band width is $\Delta\lambda = \Delta n P_0$, where $P_0$ is the pitch, $$\bar{n} = \frac{1}{2}(n_e + n_o),$$

$\Delta n = n_e - n_o$, $n_e$ and $n_o$ are the extraordinary and ordinary refractive indices, respectively.

The pitch $P_0$ can be adjusted by controlling the concentration c of the chiral dopant according to $$P_0 = \frac{1}{c \cdot HTP},$$

where HTP is the helical twisting power of the chiral dopant. Thus, the peak wavelength $\lambda = \bar{n} P_0$ can be tuned to be in the infrared, visible, or ultraviolet spectrum. To reflect a short wavelength, such as a blue light, a short-pitch cholesteric liquid crystal is required, which in return requires a high concentration c, because for a given chiral dopant, the helical twisting power HTP is fixed. However, there is an upper limit to the concentration c of the chiral dopant. When its concentration gets too high, crystallization may occur, and other desired electro-optical properties of the host nematic liquid crystals may be lost. Another approach is to choose a high twisting power chiral dopant, but these are not readily available.

According to another approach as disclosed in U.S. Pat. No. 5,668,614, the wavelength of reflected light from cholesteric liquid crystals was tuned by photo-irradiation, which caused changes in the chirality of the tunable chiral material (TCM). This technique basically destroyed or altered the chirality of the chiral dopant. When the TCM and cholesteric liquid crystal of the same handedness were mixed together, the initial mixture was designed to reflect blue light. Upon irradiation with UV light or other high energy source, the TCM was destroyed, thus the chirality was reduced, and the wavelength of light moved from blue towards red. When the TCM and cholesteric liquid crystal of the opposite handedness were mixed together, the initial mixture was designed to reflect red light. Upon photo-irradiation, again, the TCM was destroyed, thus the effective chirality was increased due to the decrease in the opposite direction, and the wavelength of light moved from red towards to blue. However, the shortest wavelength that the mixture could achieve was limited by the chirality of the cholesteric liquid crystal without having the TCM. In either case, this technique did not increase the chirality of the chiral dopant. In addition the photo-irradiation usually caused adverse effects on other components of the cholesteric liquid crystals.

PROBLEM TO BE SOLVED

There is a need for a method to generate cholesteric liquid crystals of variable wavelengths (or pitches), without using photo-irradiation, by starting from an easily available cholesteric liquid crystal of a long pitch.

SUMMARY OF THE INVENTION

The present invention relates to a method of generating at least a second peak wavelength of reflected light from a cholesteric liquid crystal having a first peak wavelength of reflected light comprising by exposing or conditioning the cholesteric liquid crystal to environmental conditions such as high temperature or high humidity. The invention also relates to an electrically modulated imaging layer comprising a liquid crystal material that has at least one conditioned and an unconditioned form, wherein the unconditioned form of the liquid crystal material reflects a first wavelength of light and wherein the conditioned form of liquid crystal material reflects a second wavelength of light and a display comprising a support, a patterned transparent first conductive layer, and a liquid crystal material that has at least one conditioned and an unconditioned form, wherein the unconditioned form of the liquid crystal material reflects a first wavelength of light and wherein the conditioned form of liquid crystal material reflects a second wavelength of light.

ADVANTAGEOUS EFFECT OF THE INVENTION

The present invention includes several advantages, not all of which are incorporated in a single embodiment. The present invention provides a method for easily adjusting cholesteric liquid crystals to reflect other optical wavelengths of light by exposing the cholesteric liquid crystal to an environment of high temperature and high humidity. This method offers a new way of making color and black/white cholesteric liquid crystals displays.

DETAILED DESCRIPTION OF THE PREFERRED EMBODIMENT

The present invention relates to a cholesteric liquid crystal having a variable wavelength or pitch. The optical wavelength reflected by the cholesteric liquid crystal can be varied by conditioning the liquid crystalline material, that is, subjecting the material to various environmental conditions, such as humidity or temperature.

The material to be conditioned is preferably a liquid crystal material. Liquid crystals can be nematic (N), chiral nematic (N*), or smectic, depending upon the arrangement of the molecules in the mesophase. Chiral nematic liquid crystal (N*LC) displays are typically reflective, that is, no backlight is needed, and can function without the use of polarizing films or a color filter.

Chiral nematic liquid crystal refers to the type of liquid crystal having finer pitch than that of twisted nematic and super-twisted nematic used in commonly encountered LC devices. Chiral nematic liquid crystals are so named because such liquid crystal formulations are commonly obtained by adding chiral agents to host nematic liquid crystals. Chiral nematic liquid crystals may be used to produce bi-stable or multi-stable displays. These devices have significantly reduced power consumption due to their non-volatile "memory" characteristic. Since such displays do not require a continuous driving circuit to maintain an image, they consume significantly reduced power. Chiral nematic displays are bistable in the absence of a field; the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known LCD devices include chemically etched, transparent, conductive layers overlying a glass substrate as described in U.S. Pat. No. 5,667,853, incorporated herein by reference.

In one embodiment, a chiral-nematic liquid crystal composition may be dispersed in a continuous matrix. Such materials are referred to as "polymer-dispersed liquid crystal" materials or "PDLC" materials. Such materials can be made by a variety of methods. For example, Doane et al. (*Applied Physics Letters,* 48, 269 (1986)) disclose a PDLC comprising approximately 0.4 μm droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again, a phase separation method is used for preparing the PDLC. The liquid-crystal material and polymer (a hydroxy functionalized polymethylmethacrylate), along with a cross-linker for the polymer, are dissolved in a common organic solvent (toluene) and coated on an indium tin oxide (ITO) substrate. A dispersion of the liquid-crystal material in the polymer binder is formed upon evaporation of toluene at high temperature. The phase separation methods of Doane et al. and West et al. require the use of organic solvents that may be objectionable in certain manufacturing environments.

In a preferred embodiment of the invention, the display device or display sheet has simply a single imaging layer of liquid crystal material along a line perpendicular to the face of the display, preferably a single layer coated on a flexible substrate. Such a structure, as compared to vertically stacked imaging layers—each between opposing substrates, is especially advantageous for monochrome shelf labels and the like. Structures having stacked imaging layers, however, are optional for providing additional advantages in some case.

Preferably, the domains are flattened spheres and have, on average, a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell or domain and, hence, the imaging layer thickness for a majority of the domains. Such a dimensional relationship is shown in U.S. Pat. No. 6,061,107, hereby incorporated by reference in its entirety.

Modern chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid; phenyl or cyclohexyl esters of cyclohexylbenzoic acid; phenyl or cyclohexyl esters of cyclohexylcyclohexanecarboxylic acid; cyclohexylphenyl esters of benzoic acid, of cyclohexanecarboxyiic acid and of cyclohexylcyclohexanecarboxylic acid; phenyl cyclohexanes; cyclohexylbiphenyls; phenyl cyclohexylcyclohexanes; cyclohexylcyclohexanes; cyclohexylcyclohexenes; cyclohexylcyclohexylcyclohexenes; 1,4-bis-cyclohexylbenzenes; 4,4-bis-cyclohexylbiphenyls; phenyl- or cyclohexylpyrimidines; phenyl- or cyclohexylpyridines; phenyl- or cyclohexylpyridazines; phenyl- or cyclohexyldioxanes; phenyl- or cyclohexyl-1,3-dithianes; 1,2-diphenylethanes; 1,2-dicyclohexylethanes; 1-phenyl-2-cyclohexylethanes; 1-cyclohexyl-2-(4-phenylcyclohexyl)ethanes; 1-cyclohexyl-2',2-biphenylethanes; 1-phenyl-2-cyclohexylphenylethanes; optionally halogenated stilbenes; benzyl phenyl ethers; tolanes; substituted cinnamic acids and esters; and further classes of nematic or nematogenic substances. The 1,4-phenylene groups in these compounds may also be laterally mono- or difluorinated.

The liquid crystalline material of this preferred embodiment is based on the achiral compounds of this type. The most important compounds, that are possible as components of these liquid crystalline materials, can be characterized by the following formula

R'—X—Y-Z-R"

wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, —B-Phe- and —B-Cyc-; wherein Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl) ethyl, pyrimidine-2,5-diyl, pyridine-2,5-diyl or 1,3-dioxane-2,5-diyl. Y in these compounds is selected from the following bivalent groups —CH═CH—, —C≡C—, —N═N(O)—, —CH═CY'—, —CH═N(O)—, —CH2—CH2—, —CO—O—, —CH2—O—, —CO—S—, —CH2—S—, —COO-Phe-COO— or a single bond, with Y' being halogen, preferably chlorine, or —CN; R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds, R' and R' are, in each case, independently of each other, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bi-stability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy, should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including, among others, its chemical compatibility with the nematic host, helical twisting power, temperature sensitivity, and light fastness. Many chiral dopant classes are known in the art: e.g., G. Gottarelli and G. Spada, *Mol. Cryst. Liq. Crys.*, 123, 377 (1985); G. Spada and G. Proni, *Enantiomer*, 3, 301 (1998) and references therein. Typical well-known dopant classes include 1,1-binaphthol derivatives; isosorbide (D-1) and similar isomannide esters as disclosed in U.S. Pat. No. 6,217,792; TADDOL derivatives (D-2) as disclosed in U.S. Pat. No. 6,099,751; and the pending spiroindanes esters (D-3) as disclosed in U.S. patent application Ser. No. 10/651,692 by T. Welter et al., filed Aug. 29, 2003, titled "Chiral Compounds And Compositions Containing The Same," hereby incorporated by reference.

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $p_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP.c)$$

where c is the concentration of the chiral dopant and HTP is the proportionality constant.

For some applications, it is desired to have LC mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultra-light, flexible, and inexpensive displays for notebook and desktop computers, instrument panels, video game machines, videophones, mobile phones, hand-held PCs, PDAs, e-books, camcorders, satellite navigation systems, store and supermarket pricing systems, highway signs, informational displays, smart cards, toys, and other electronic devices.

Chiral nematic liquid crystal materials and cells, as well as polymer stabilized chiral nematic liquid crystals and cells, are well known in the art and described in, for example, co-pending application Ser. No. 07/969,093 filed Oct. 30, 1992; Ser. No. 08/057,662 filed May 4, 1993; Yang et al., Appl. Phys. Lett. 60(25) pp 3102-04 (1992); Yang et al., J. Appl. Phys. 76(2) pp 1331 (1994); published International Patent Application No. PCT/US92/09367; and published International Patent Application No. PCT/US92/03504, all of which are incorporated herein by reference.

Liquid crystal domains, also referred to as droplets, cells or micelles, may be preferably made using a limited coalescence methodology, as disclosed in U.S. Pat. Nos. 6,556,262 and 6,423,368, incorporated herein by reference. Limited coalescence is defined as dispersing a light-modulating material below a given size, and using coalescence limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties.

The liquid crystalline material is conditioned to produce cholesteric liquid crystals of varying wavelengths or pitch. First, a liquid crystal material is selected, possibly already positioned in a display device, which reflects a particular optical wavelength $\lambda_0$. This material or display is conditioned by exposing the liquid crystalline coated layer to particular environmental conditions for a period of time. The preferred conditions are humidity and heat, both higher than ambient, with a combination of the two most preferred. Preferably, the liquid crystalline material is conditioned at a relative humidity greater than 70%, with the most preferred conditions at humidity levels greater than 80%. Preferably, the temperature is 49 C or higher. Again, the most preferred conditioning occurs at both elevated humidity and elevated heat. Conditioning is also desirable with the elevation of humidity without elevation of temperature. The time of exposure to the elevated conditions varies, with a minimum of about 2 hours preferred. Another preferred time of conditioning varies from 2 to 96 hours. After exposure, the cholesteric liquid crystal has a wavelength $\lambda_1$. Typically, $\lambda_1$ is less than $\lambda_0$.

As used herein, the phase a "liquid crystal display" (LCD) is a type of flat panel display used in various electronic devices. At a minimum, an LCD comprises a substrate, at least one conductive layer and a liquid crystal layer. LCDs may also comprise two sheets of polarizing material with a liquid crystal solution between the polarizing sheets. The sheets of polarizing material may comprise a substrate of glass or transparent plastic. The LCD may also include functional layers.

Figure 1:
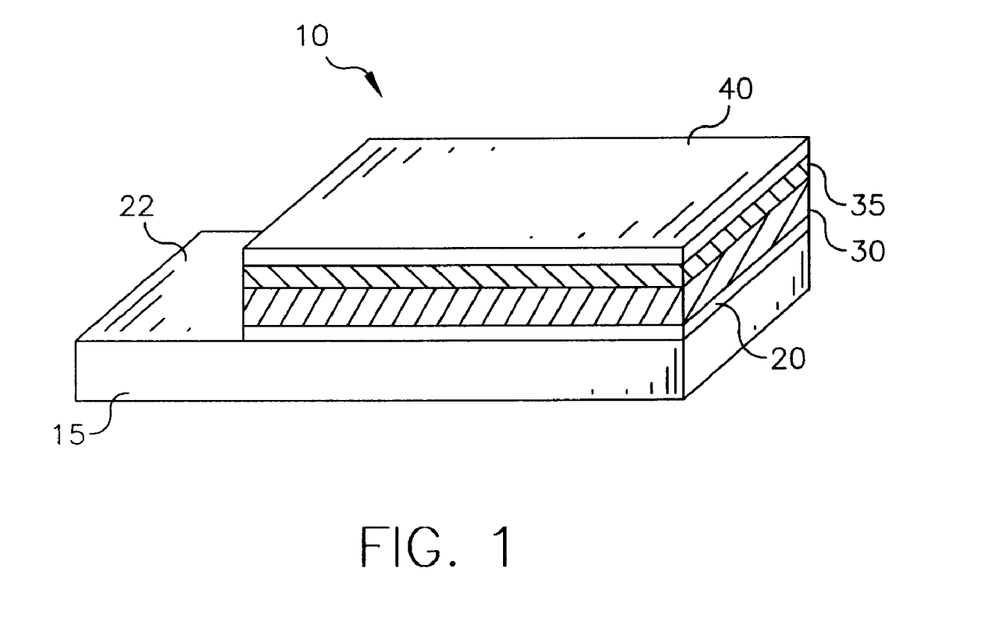
FIG. 1 is a partial cross sectional view of a prior art display that can incorporate the cholesteric liquid crystal processed in accordance with the present invention.

In one embodiment of an LCD 10, illustrated in FIG. 1, a transparent, multilayer flexible support 15 is coated with a first conductive layer 20, which may be patterned, onto which is coated the light-modulating liquid crystal layer 30. A second conductive layer 40 is applied over the liquid crystalline layer 30. Optionally, the second conductive layer may be overcoated with a dielectric layer, to which dielectric conductive row contacts are attached, including vias that permit interconnection between conductive layers and dielectric conductive row contacts. An optional nano-pigmented functional layer 35 may be applied between the liquid crystal layer 30 and the second conductive layer 40. First transparent conductor 20 can be tin-oxide, indium-tin-oxide (ITO), or polythiophene, with ITO being the preferred material. Typically the material of first transparent conductor 20 is sputtered or coated as a layer over display substrate 15 having a resistance of less than 1000 ohms per square.

The liquid crystal (LC) is used as an optical switch. The substrates are usually manufactured with transparent, conductive electrodes, in which electrical "driving" signals are coupled. The driving signals induce an electric field which can cause a phase change or state change in the LC material, the LC exhibiting different light-reflecting characteristics according to its phase and/or state.

The LCD contains at least one conductive layer, which typically is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.) Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin-oxide or indium-tin-oxide (ITO), or polythiophene, with ITO being the preferred material. Typically, the conductive layer is sputtered onto the substrate to a resistance of less than 250 ohms per square. Alternatively, conductive layer may be an opaque electrical conductor formed of metal such as copper, aluminum or nickel. If the conductive layer is an opaque metal, the metal can be a metal oxide to create a light absorbing conductive layer.

Indium tin oxide (ITO) is the preferred conductive material, as it is a cost effective conductor with good environmental stability, up to 90% transmission, and down to 20 ohms per square resistivity. An exemplary preferred ITO layer has a % transmittance (T) greater than or equal to 80% in the visible region of light, that is, from greater than 400 nm to 700 nm, so that the film will be useful for display applications. In a preferred embodiment, the conductive layer comprises a layer of low temperature ITO which is polycrystalline. The ITO layer is preferably 10-120 nm in thickness, or 50-100 nm thick to achieve a resistivity of 20-60 ohms/square on plastic. An exemplary preferred ITO layer is 60-80 nm thick.

The conductive layer is preferably patterned, most preferably into a plurality of electrodes. The patterned electrodes may be used to form a LCD device. In another embodiment, two conductive substrates are positioned facing each other and cholesteric liquid crystals are positioned therebetween to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70, and greater than 100 nanometers are also possible.

Cholesteric layer 30 overlays a first portion of first transparent conductor 20. The cholesteric material making up the cholesteric layer may be any of the cholesteric materials described more fully above. A portion of cholesteric layer 30 may be removed or left uncoated to expose first conductor 20 to permit electrical contact. Cholesteric layer 30 contains cholesteric liquid crystal material, such as those disclosed in U.S. Pat. No. 5,695,682 issued Dec. 9, 1997 to Doane et al. Application of electrical fields of various intensity and duration can be employed to drive a chiral nematic material (cholesteric) into a reflective state, to a substantially transparent state, or an intermediate state. These materials have the advantage of having first and second optical states that are both stable in the absence of an electrical field. The materials can maintain a given optical state indefinitely after the field is removed. Cholesteric liquid crystal materials can be Merck BL112, BL118 or BL126, available from E.M. Industries of Hawthorne, N.Y.

In an exemplary embodiment, the cholesteric layer 30 is E.M. Industries' cholesteric material BL-118 dispersed in deionized photographic gelatin. The liquid crystal material is mixed at 8% concentration in a 5% gelatin aqueous solution. The liquid crystal material is dispersed to create an emulsion having 8-10 micron diameter domains of the liquid crystal in aqueous suspension. The domains can be formed using the limited coalescence technique described in U.S. Pat. No. 6,423,368, incorporated herein by reference. The emulsion is coated on a polyester display substrate over the first transparent conductor(s) and dried to provide an approximately 9-micron thick polymer dispersed cholesteric coating. Other organic binders such as polyvinyl alcohol (PVA) or polyethylene oxide (PEO) can be used in place of the gelatin. Such emulsions are machine coatable using coating equipment of the type employed in the manufacture of photographic films. A thin layer of gelatin can be applied over the first transparent conductor 20 to provide an insulator prior to applying cholesteric layer 30 as disclosed copending U.S. patent application Ser. No. 09/915,441.

Figure 2:
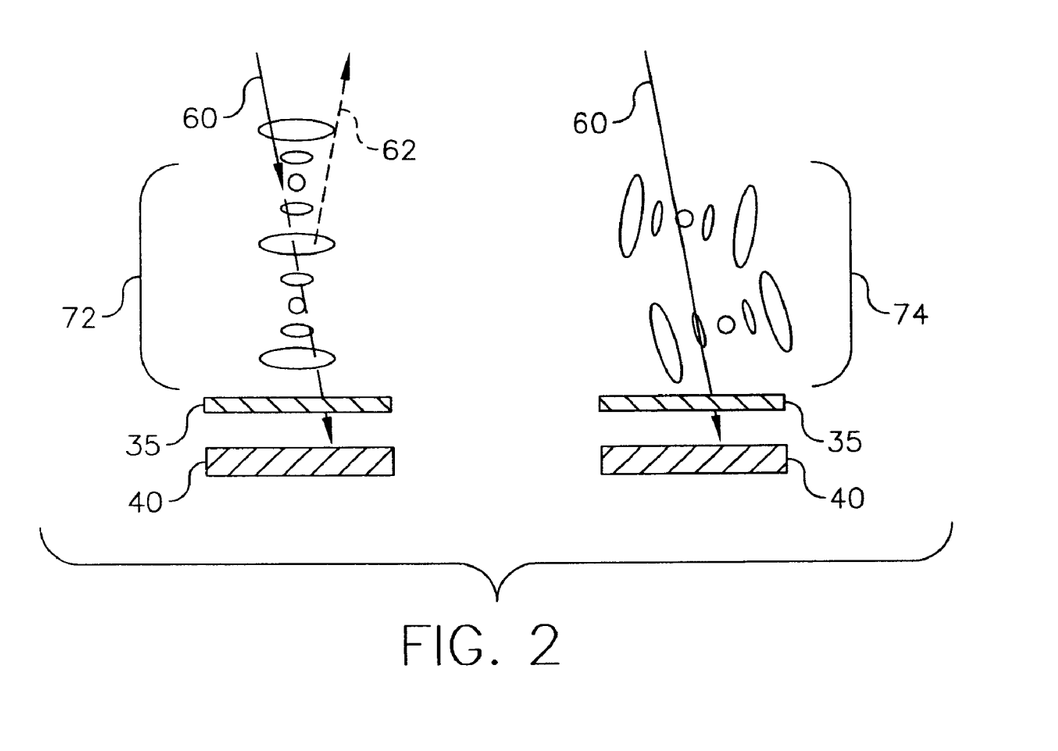
FIG. 2 is a schematic side view of chiral nematic material in a planar and focal-conic state responding to incident light useful in describing the operation of the display of FIG. 1.

FIG. 2 is a schematic side sectional view of a chiral nematic material in a planar and focal-conic state responding to incident light. In the figure on the left, after a high voltage field has been applied and quickly switched to zero potential, the liquid crystal molecules become planar liquid crystal 72, which reflect portions of incident light 60 as reflected light 62. In the figure on the right side of FIG. 2, upon application of a lower voltage field, the molecules of the chiral nematic material break into weakly forward scattering cells known as focal-conic liquid crystal 74. Increasing the time duration of a low-voltage pulse progressively drives the molecules that were originally reflective state planar liquid crystal 72 towards a fully evolved and weakly light scattering focal-conic state liquid crystal 74.

A light absorbing dark layer 35, also referred to herein as a dark layer because it absorbs visible and IR light, but it can absorb only a portion of the visible spectrum and has a colored appearance, is positioned on the side opposing the incident light 60. Dark layer 35 can be a thin layer of light absorbing, sub-micron carbon in a gel binder as disclosed in copending U.S. patent application Ser. No. 10/036,149. Dark layer 35 can be placed on the other side of the second conductive layer 40. As fully evolved focal-conic liquid crystal 74, the cholesteric liquid crystal is forward light scattering and incident light 60 passing through dark layer 35 is absorbed to create a black image. Progressive evolution towards the focal-conic state causes a viewer to perceive reflected light 62 that is reduced to black as the cholesteric material changes from reflective planar liquid crystal 72 to a fully evolved light scattering focal-conic liquid crystal 74. When the field is removed, cholesteric layer 30 maintains a given optical state indefinitely. The states are more fully discussed in U.S. Pat. No. 5,437,811, referenced above and incorporated herein by reference.

The light absorbing dark layer, may also be referred to as a color contrast layer. Color contrast layers may be radiation reflective layers or radiation absorbing layers. In some cases, the rearmost substrate of each display may preferably be painted black. The black paint absorbs infrared radiation that reaches the back of the display. In the case of the stacked cell display, the contrast may be improved by painting the back substrate of the last visible cell black. The paint is preferably transparent to infrared radiation. This effectively provides the visible cell with a black background that improves its contrast, and yet, does not alter the viewing characteristics of the infrared display. Paint such as black paint, which is transparent in the infrared region, is known to those skilled in the art. For example, many types of black paint used to print the letters on computer keys are transparent to infrared radiation. In one embodiment, a light absorber may be positioned on the side opposing the incident light. In the fully evolved focal-conic state, the chiral nematic liquid crystal is transparent, passing incident light, which is absorbed by the light absorber to create a black image. Progressive evolution of the focal-conic state causes a viewer to perceive a reflected light that transitions to black as the chiral nematic material changes from planar state to a focal conic state. The transition to the light transmitting state is progressive, and varying the low voltage time permits variable levels of reflection. These variable levels may be mapped out to corresponding gray levels, and when the field is removed, the light-modulating layer maintains a given optical state indefinitely. This process is more fully discussed in U.S. Pat. No. 5,437,811, incorporated herein by reference.

The color contrast layer may also be other colors. In another embodiment, the dark layer comprises milled non-conductive pigments. The materials are milled below 1 micron to form "nano-pigments". Such pigments are effective in absorbing wavelengths of light in very thin or "sub micron" layers. In a preferred embodiment, the dark layer absorbs all wavelengths of light across the visible light spectrum, that is, from 400 nanometers to 700 nanometers wavelength. The dark layer may also contain a set or multiple pigment dispersions. For example, three different pigments, such as a Yellow pigment milled to median diameter of 120 nanometers, a magenta pigment milled to a median diameter of 210 nanometers, and a cyan pigment, such as Sunfast® Blue Pigment 15:4 pigment, milled to a median diameter of 110 nanometers are combined. A mixture of these three pigments produces a uniform light absorption across the visible spectrum. Suitable pigments are readily available and are designed to be light absorbing across the visible spectrum. In addition, suitable pigments are inert and do not carry electrical fields.

Suitable pigments used in the color contrast layer may be any colored materials, which are practically insoluble in the medium in which they are incorporated. The preferred pigments are organic in which carbon is bonded to hydrogen atoms and at least one other element such as nitrogen, oxygen and/or transition metals. The hue of the organic pigment is primarily defined by the presence of one or more chromophores, a system of conjugated double bonds in the molecule, which is responsible for the absorption of visible light. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolopyrrole, and thioindigo, and anthriquinone pigments such as anthrapyrimidine, triarylcarbonium and quinophthalone.

Returning to FIG. 1, dark layer 35 is disposed between second conductor 40 and cholesteric layer 30 to improve contrast. A second conductor 40 overlays cholesteric layer 30. Second conductor 40 has sufficient conductivity to provide an electric field between the first transparent conductor 20 and second conductor 40 strong enough to change the optical state of the cholesteric material in cholesteric layer 30. Second conductor 40 can be formed, for example, by the well-known technique of vacuum deposition for forming a layer of conductive material such as aluminum, tin, silver, platinum, carbon, tungsten, molybdenum, tin or indium or combinations thereof. Second conductor 40 can also be formed by screen printing a conductive ink such as Electrodag 423SS screen printable electrical conductive material from Acheson Corporation. Such screen printable conductive materials comprise finely divided graphite particles in a thermoplastic resin. Screen printing is preferred to minimize the cost of manufacturing the display. A first conductor cover 22 can be similarly printed over first transparent conductor 20. First conductor cover 22 protects first transparent conductor 20 from abrasion.

The display may also contain a second conductive layer applied to the surface of the light-modulating layer. The second conductive layer desirably has sufficient conductivity to carry a field across the light-modulating layer. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin-oxide or indium-tin oxide, resulting in the layer being transparent. Alternatively, second conductive layer may be printed conductive ink.

For higher conductivities, the second conductive layer may comprise a silver-based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

The LCD may also comprise at least one "functional layer" between the conductive layer and the substrate. The functional layer may comprise a protective layer or a barrier layer. A preferred barrier layer may acts as a gas barrier or a moisture barrier and may comprise SiOx, AlOx or ITO. The protective layer, for example, an acrylic hard coat, functions to prevent laser light from penetrating to functional layers between the protective layer and the substrate, thereby protecting both the barrier layer and the substrate. The protective layer useful in the practice of the invention can be applied in any of a number of well-known techniques, such as dip coating, rod coating, blade coating, air knife coating, gravure coating and reverse roll coating, extrusion coating, slide coating, curtain coating, and the like. The lubricant particles and the binder are preferably mixed together in a liquid medium to form a coating composition. The liquid medium may be a medium such as water or other aqueous solutions in which the hydrophilic colloid are dispersed with or without the presence of surfactants. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. Since the liquid crystal are switched between states by voltage, charge accumulation of sufficient voltage on the web surface may create an electrical field that when discharged may switch a portion of the liquid crystal. It is well known in the art of photographic web based materials that winding, conveying, slitting, chopping and finishing can cause charge build on many web-based substrates. High charge buildup is a particular problem with plastic webs that are conductive on one side but not on the other side. Charges accumulates on one side on the web to the point of discharge and in photographic light sensitive materials that discharge can result in fog which is uncontrolled light exposure as a result of the spark caused from the discharge. Similar precaution and static management is necessary during manufacturing or in end use applications for liquid crystal displays. In another embodiment of this invention, the antistatic layer has a surface resistivity of between $10^5$ to $10^{12}$. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

The use of a flexible support for display substrate 15; first transparent conductor 20; machine coated dark layer 35 and cholesteric layer 30; and printed second conductor 40 and first conductor cover 22 permits the fabrication of a low cost flexible display.

The flexible plastic substrate can be any flexible self-supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least about 200° C., some up to 3000-350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl(x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene)fluoropolymer (PETFE), and poly (methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L.P., Tokyo Japan; Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec." Lintec contains UV-cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wis.

EXAMPLES

The following experiments were designed in order to illustrate the invention and investigate what factors control the color shift.

Sample Preparation

A series of test patches were made to resemble the display format illustrated by FIG. 1.

Example Preparation

An experiment was performed using cholesteric liquid crystal oil MERCK BL118 with a peak wavelength of approximately 560 nm, available from E.M. Industries of Hawthorne, N.Y. U.S.A. by limited coalescence in accordance with the procedure described in U.S. Pat. No. 6,556, 262 to Stephenson, incorporated herein by reference.

For an emulsion having domain size of approximately 10 microns, the following procedure was used: The emulsions were made by first preparing BL118 slurry. A solution of 230 gms of distilled water, 103.5 gms BL118, 3.41 gms LUDOX® M50, and 7.12 gms of MAE adipate. Simultaneously, a solution of MAE adipate consisting of 2.0 gms MAE adipate and 18 gms distilled water was prepared. The solutions were added together, heated to 50 C, and mixed with a high shear Silverson mixer at 5000 rpm for 2 minutes. The solution was then passed through a Microfluidizer twice at 3000 psi at 50 C. 408 gms of a 1000 gm batch of gelatin solution, made of 90 gms of dry gel, 2 gms of biocide to 908 gms of water, melted at 50 C, was then added to the Microfluidized BL118 slurry.

Coatings were prepared by making aqueous coating solutions, each containing 8 weight percent of the liquid crystal emulsion specified and 5 weight percent gelatin and about 0.2 weight percent of a coating surfactant. The coating solutions were heated to 45° C., to reduce the viscosity of the emulsion to approximately 8 centipoises. A polyethylene terephthalate substrate with 125-micron thickness and 5-inch width having an indium tin oxide conductive layer (300 ohms/sq.) was continuously coated and dried with the heated emulsion at 61.5 cm$^3$/m$^2$ on a coating machine. After the coating was complete, the second conductor was applied using a screen-printed graphitic ink (Acheson 423SS) patch to make displays of the invention. This graphitic ink acted as a dark layer as well as the second conductive layer.

The series of the same coated samples were placed into the chambers with the environmental conditions. The dried samples were placed into four separate environmental chambers and removed at a specified time to investigate the visual response as a result of the aging and environmental conditions. The four environmental conditions used were:

24° C. dry bulb/10% Relative Humidity (–9.2° C. wet bulb),
24° C. dry bulb/90% Relative Humidity (22.3° C. wet bulb),
49° C. dry bulb/10% Relative Humidity (9.5° C. wet bulb),
49° C. dry bulb/90% Relative Humidity (46.9° C. wet bulb).

Each sample was placed into the environmental conditions for a set period of time, taken out, and evaluated in ambient room conditions. The time frame ranged from 0 to 96 hours. The individual samples were then taken out of the environmental conditions and the reflective response was measured using a X-Rite 938 Spectrodensitometer. The test is LAB D$^{50}$$_2$. All the data was taken on a black background.

Figure 6A:
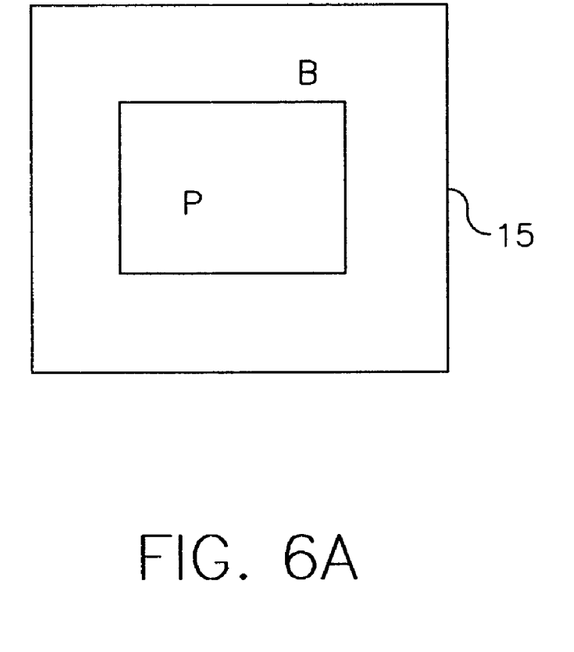
FIGS. 6A, 6B are views of a test patch from the substrate side and from the dark layer side.
Figure 6B:
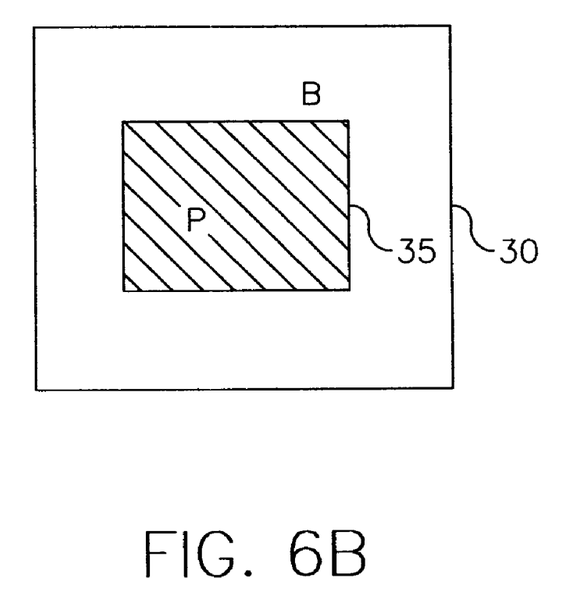

FIGS. 6A, 6B show the views of a test patch from the substrate side 15 and from the dark layer 35 side respectively. Each test patch had a pixel area designated by the letter "P" where a layer of conductive ink or dark layer 35 was deposited in combination with a liquid crystalline layer 30, which extended over the whole sample, and a surrounding area designated by the letter "B" where no conductive ink or dark layer 35 was applied. The layer of cholesteric liquid crystals 30 in the surrounding area "B" was not electrically switchable.

Experiment 1

A chamber, where humidity and temperature was independently adjustable, was used for exposure of the test patches. In Experiment 1, inside the chamber, the dry bulb temperature was set at 49° C., and the relative humidity (RH) was 90%. Test patches were exposed to the tropical conditions (49° C. and 90% RH or –46.9° C. wet bulb) for various times ranging from 0 to 96 hours.

Experiment 2 (Inventive Example)

The conditions in experiment 2 are similar to ones in experiment 1 except the temperature. In Experiment 2, inside the chamber, the dry bulb temperature was set at 24° C., and the relative humidity (RH) was 90%. Test patches were exposed to these conditions (24° C. dry bulb and 90% RH or 22.3° C. wet bulb) for various times ranging from 0 to 96 hours. Similar changes in peak wavelengths as observed to experiment 1 were observed in this experiment, but the change is less profound.

Experiment 3 (Comparative Example)

In Experiment 3, inside the chamber, dry bulb the temperature was set at 24° C., and the relative humidity (RH) was 10%. Test patches were exposed to these conditions (24° C. and 10% RH or –9.2° C. wet bulb) for various times ranging from 0 to 96 hours. There were no observable changes in reflectance spectrum and in peak wavelengths.

Experiment 4 (Comparative Example)

In Experiment 4, inside the chamber, the dry bulb temperature was set at 49° C., and the relative humidity (RH) was 10%. Test patches were exposed to these conditions (49° C. and 10% RH or 9.5° C. wet bulb) for various times ranging from 0 to 96 hours. Similar to experiment 3, there were no observable changes in reflectance spectrum and in peak wavelengths.

The following table is a summary of peak wavelengths measured when the test patches were exposed for 0, 36, and 96 hours to the four conditions discussed in Experiments 1 through 4.

| Ex # | Conditions - dry bulb temperature and RH | Conditions - wet bulb temperature | Peak Wavelength (t = 0) | Peak Wavelength (t = 36 hours) | Peak Wavelength (t = 96 hours) |
|---|---|---|---|---|---|
| 3 | 24° C. dry bulb/ 10% RH | –9.2° C. wet bulb | 564 ± 5 nm | 564 ± 5 nm | 564 ± 5 nm |
| 4 | 49° C. dry bulb/ 10% RH | 9.5° C. wet bulb | 564 ± 5 nm | 564 ± 5 nm | 564 ± 5 nm |
| 2 | 24° C. dry bulb/ 90% RH | 22.3° C. wet bulb | 564 ± 5 nm | 502 ± 5 nm | 472 ± 5 nm |
| 1 | 49° C. dry bulb/ 90% RH | 46.9° C. wet bulb | 564 ± 5 nm | 492 ± 5 nm | 458 ± 5 nm |

Evaluation—Reflectance and Color Shift

Figure 3A:
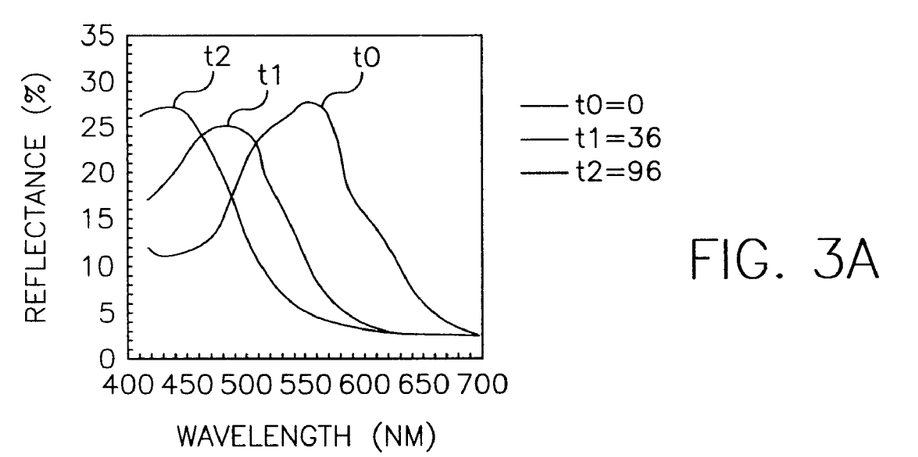
FIGS. 3A, 3B, 3C are exposure time dependence of reflection spectra of the pixel areas that were refreshed into a planar state (reflecting a green light), the pixel areas that were in an as-coated planar state, and the surrounding areas, respectively.

FIG. 3A shows exposure time dependence of reflection spectra of the test patch/pixel areas that are refreshed into a planar state. The curve corresponding to t0=0 is the original reflection spectra of the test patch before it was placed into the test chamber. The commercially available liquid crystal BL118 chosen for use in the test patch was a cholesteric liquid crystal which reflected a green light. The curves corresponding to t1 and t2 are reflection spectra of the test patch after it had been conditioned in the test chamber for 36 and 96 hours, respectively. The peak reflection wavelengths shifted from approximately 560 nm at t0=0 to 480 nm after the exposure time of 36 hours (t1), and to 440 nm when the exposure time was 96 hours (t2).

Figure 3B:
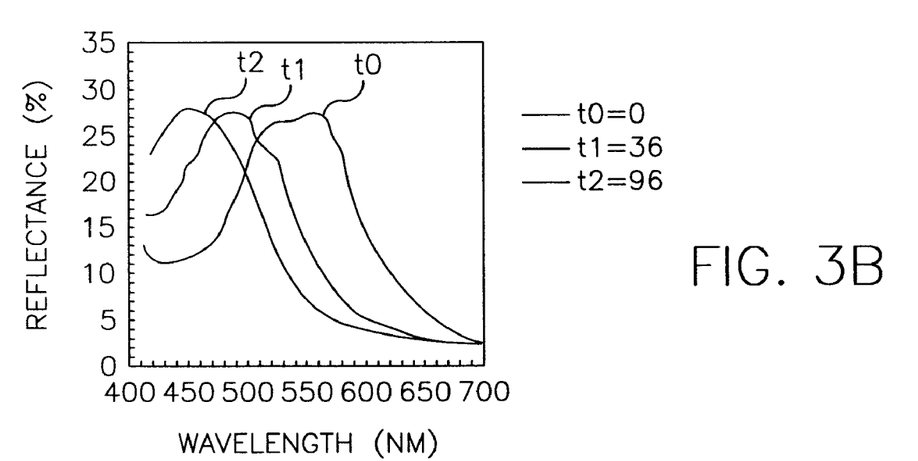

FIG. 3B is similar to FIG. 3A, except that the reflection spectra were measured from the pixel areas that were in an as-coated planar state. Again, the curve corresponding to t0=0 is the original reflection spectra of the test patch before it was placed into the test chamber. The curves corresponding to t1 and t2 are reflection spectra of the test patch after it had been conditioned in the test chamber for 36 and 96 hours, respectively. The peak reflection wavelengths were about 490 nm at the exposure time of 36 hours (t1), and 458 nm at exposure time of 96 hours (t2).

Figure 3C:
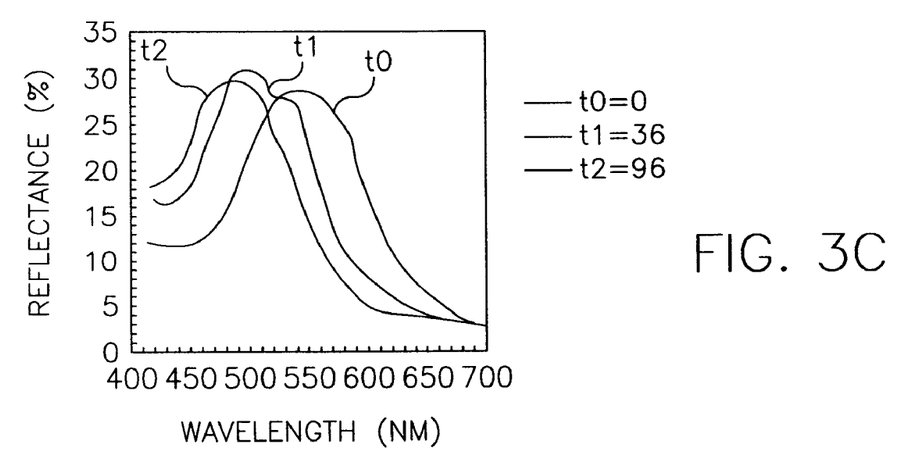

FIG. 3C is similar to FIG. 3B, except that the reflection spectra were measured from the surrounding areas that were in an as-coated planar state. The surrounding areas did not have a pair of electrodes across the cholesteric liquid crystal and was not electrically switchable. The peak reflection wavelengths were around 507 nm when the exposure time was 36 hours (t1), and 488 nm when the exposure time was 96 hours (t2).

Figure 4:
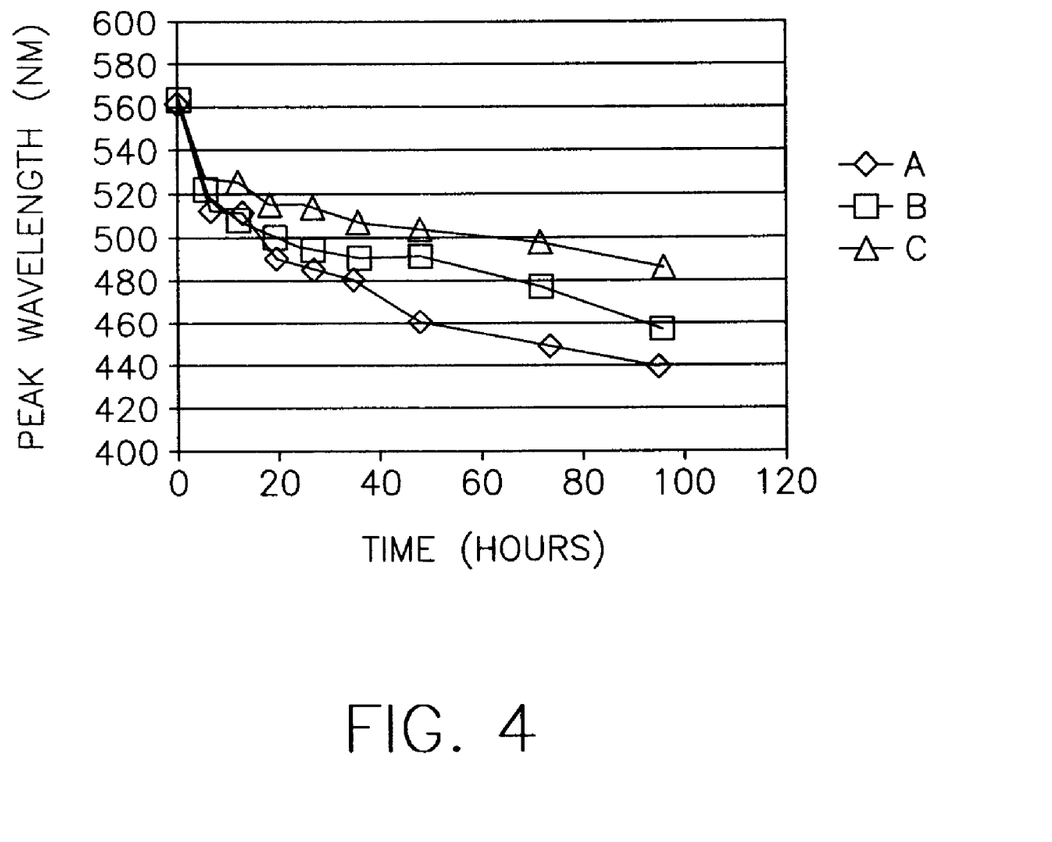
FIG. 4 is a plot of peak wavelength vs. exposure time for the display used in FIGS. 3A, 3B, and 3C according to the present invention.

In FIG. 4, the peak reflection wavelengths vs. exposure times are summarized for the test patches discussed referring to FIGS. 3A, 3B, and 3C. The curves labeled with filled diamonds (curve a), empty squares (curve b), and empty triangles (curve c) correspond to the pixel areas that were in a refreshed planar state, the pixel areas that were in an as-coated planar state, and the surrounding unswitchable areas, respectively. They all show the same trend—as the exposure time increases, the peak reflection wavelength shifts from a longer wavelength to a shorter wavelength. The pixel areas that were in a refreshed planar state has more color shift in peak reflection wavelength than the pixel areas that were in an as-coated planar state, and the surrounding areas. The three areas (pixel areas that were in a refreshed planar state, the pixel areas that were in an as-coated planar state, and the surrounding area) had about the same peak wavelength around 560 nm before being placed into the chamber, but after 96 hours in the chamber, the peak reflection wavelength became 440 nm, 458 nm, 488 nm, respectively. For pixel areas that were switched into a focal conic state or a gray level state (a combination of planar and focal conic states), a similar trend of color shift had also been observed, but with different degree of color shift.

Figure 5A:
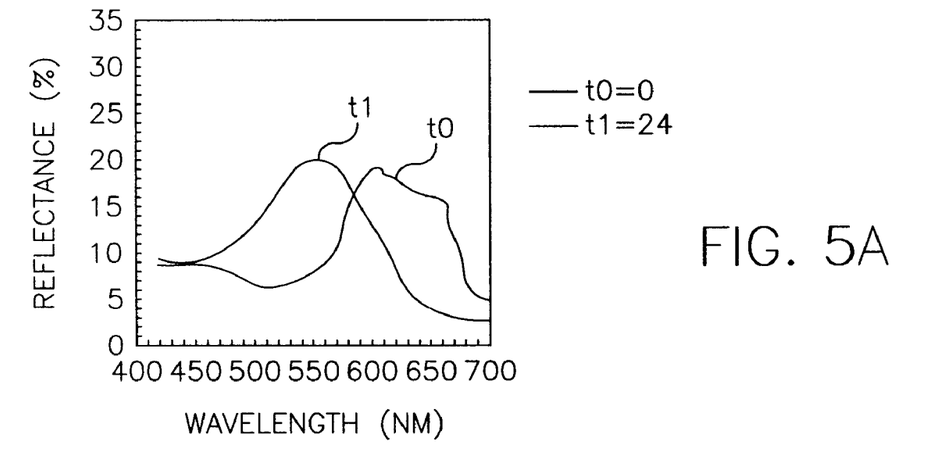
FIGS. 5A, 5B, 5C are exposure time dependence of reflection spectra of the pixel areas that were refreshed into a planar state (reflecting a red light), the pixel areas that were in an as-coated planar state, and the surrounding areas, respectively.
Figure 5B:
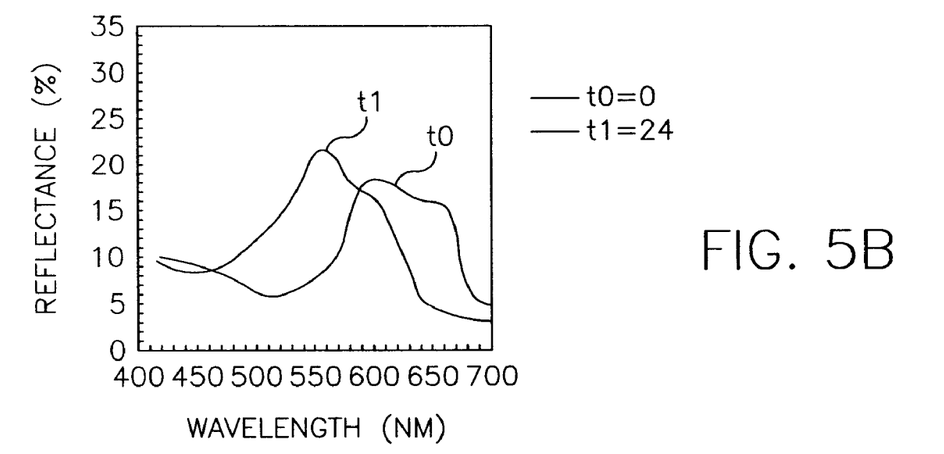
Figure 5C:
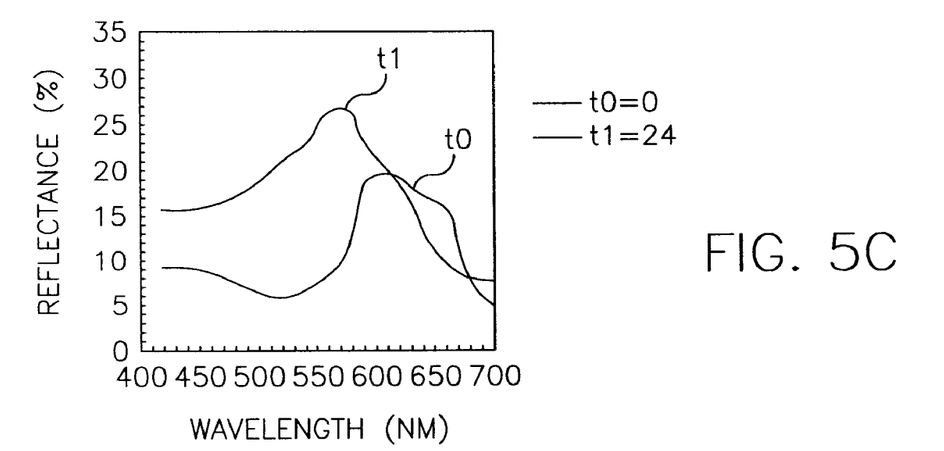

FIGS. 5A, 5B, and 5C are similar to FIGS. 3A, 3B, and 3C, except that the liquid crystal used in the test patches reflected a red light. The curves corresponding to t0=0 in FIGS. 5A, 5B, 5C are the original reflection spectra of the pixel areas that were in a refreshed planar state, the pixel areas that were in an as-coated planar state, and the surrounding areas, respectively. The curves corresponding to t1=24 in FIGS. 5A, 5B, 5C are the reflection spectra of the pixel areas that were in a refreshed planar state, the pixel areas that were in an as-coated planar state, and the surrounding areas, respectively, after they were exposed to high temperature (49° C.) and high humidity (RH 90%) for 24 hours. The peak wavelengths of the reflection spectra again shift to shorter wavelength.

Stability

The test patches with various peak wavelengths (or colors) were then kept in a room condition for over a year. After 1 year, all test patches with various colors were electrically switchable and showed essentially the same spectral responses as previously demonstrated. The long term stability of test patches with various colors allows practical use of them in a display application.

The invention has been described in detail with particular reference to certain preferred embodiments thereof, but it will be understood that variations and modifications can be effected within the spirit and scope of the invention.

The invention claimed is:

1. A method of generating at least a second peak wavelength of reflected light from a cholesteric liquid crystal having a first peak wavelength of reflected light comprising:
    a) exposing/conditioning the cholesteric liquid crystal to a high humidity for a period of time.

2. The method of claim 1 wherein said exposing is to a high temperature and a high humidity.

3. The method of claim 1, wherein the first wavelength is in the infrared spectrum.

4. The method of claim 1, wherein the first wavelength is in the visible spectrum.

5. The method of claim 1, wherein the second wavelength is in the visible spectrum.

6. The method of claim 1, wherein the second wavelength is shorter than the first wavelength.

7. The method of claim 6, wherein said second wavelength is at least 90 nm shorter than said first wavelength.

8. The method of claim 1, wherein said temperature is higher than ambient temperature.

9. The method of claim 8, wherein the temperature is above 40° C.

10. The method of claim 1, wherein the temperature is above 40° C.

11. The method of claim 1, wherein the relative humidity is higher than ambient.

12. The method of claim 11, wherein the relative humidity is above 70% RH.

13. The method of claim 11, wherein the relative humidity is above 80% RH.

14. The method of claim 2, wherein the temperature is 24° C. dry bulb at 90% relative humidity (22.3° C. wet bulb).

15. The method of claim 2, wherein the temperature is 49° C. dry bulb at 90% relative humidity (46.9° C. wet bulb).

16. The method of claim 1, wherein the cholesteric liquid crystal is in a planar state.

17. The method of claim 1, wherein the cholesteric liquid crystal is in a focal conic state.

18. The method of claim 1, wherein the cholesteric liquid crystal is placed between two electrodes.

19. The method of claim 1, wherein said conditioning is for a period of time of at least 2 hours.

20. The method of claim 1, wherein said conditioning is for a period of time of from 2 to 96 hours.

* * * * *